United States Patent
Shimoji et al.

[15] 3,637,236
[45] Jan. 25, 1972

[54] COUPLING DEVICE OF TRAILERS

[72] Inventors: Shusuke Shimoji, 6-4, 5-chome, Mama, Ichikawa, Chiba; Yasuyuki Takeshita, 22-6 Araki-cho, Shinjuka-ku, Tokyo, both of Japan

[22] Filed: June 3, 1970

[21] Appl. No.: 43,148

[30] Foreign Application Priority Data

Mar. 9, 1970 Japan...................45/19622

[52] U.S. Cl..............................280/419, 280/100, 280/408
[51] Int. Cl.........................................................B62d 53/00
[58] Field of Search.......................280/419, 408, 100, 102

[56] References Cited

UNITED STATES PATENTS

| | | | |
|---|---|---|---|
| 1,529,630 | 3/1925 | Jonkhoff | 280/419 |
| 1,868,912 | 7/1932 | Plank | 280/100 |
| 2,191,184 | 2/1940 | Voorheis | 280/100 |

FOREIGN PATENTS OR APPLICATIONS 306,602   3/1933   Italy.............................280/408

*Primary Examiner*—Leo Friaglia
*Attorney*—Ostrolenk, Faber, Gerb & Soffen

[57] ABSTRACT

A carriage having a pair of wheels, each pair being rollingly mounted to associated axles which, in turn, are mounted by pivot assemblies to the carriage. Towing and steering levers are coupled to each of the pivot assemblies for respectively towing the carriage and steering its associated axle. The axles are mechanically coupled to transmit rotational movement therebetween. The towing and steering levers of either end of the carriage may be selectively joined at their free ends when being used to pull the carriage thereby increasing the flexibility of use of the carriage by permitting either end of the carriage to be employed as the end to be pulled. Connection between levers of a carriage and trailer or a carriage and another trailer is provided for by a suitable coupling assembly. The towing levers may be adjusted to appropriate lengths to suit particular needs.

6 Claims, 8 Drawing Figures

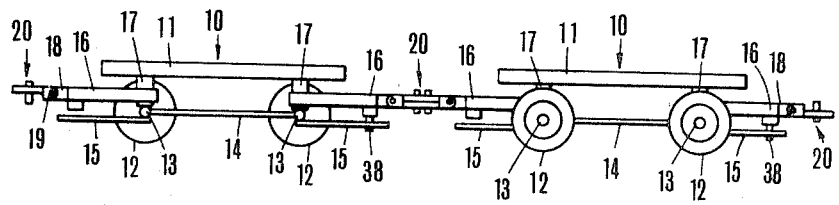
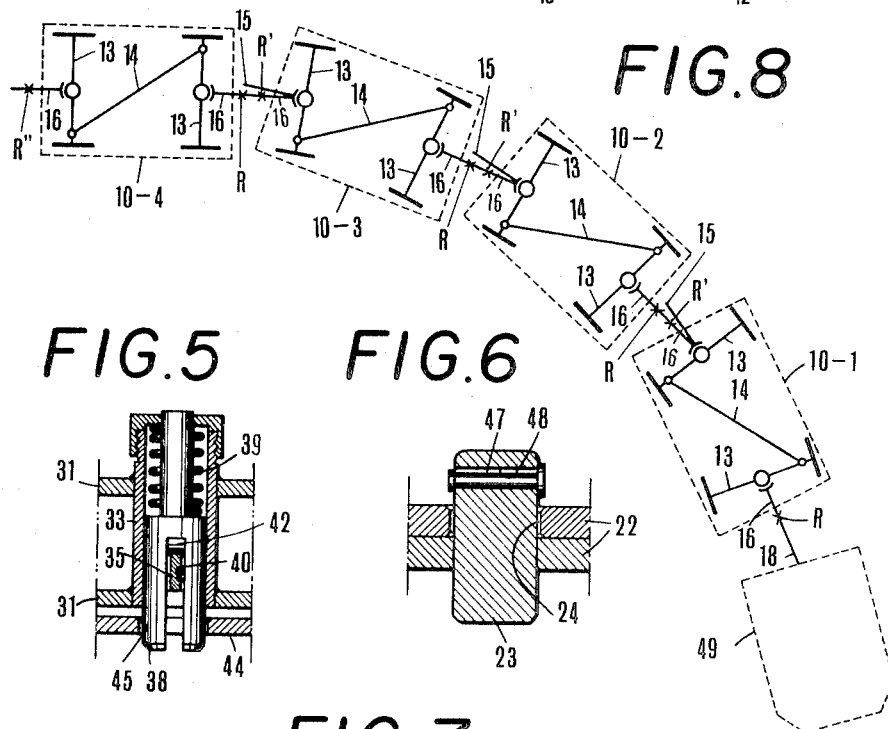
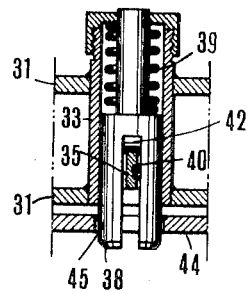
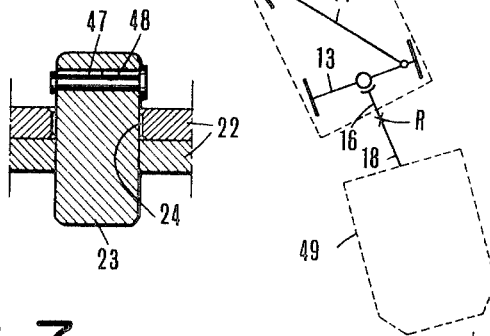
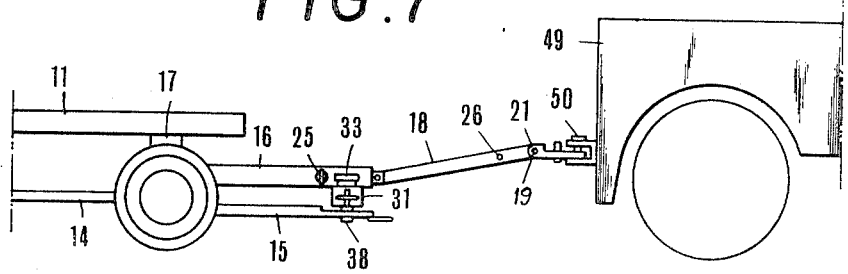

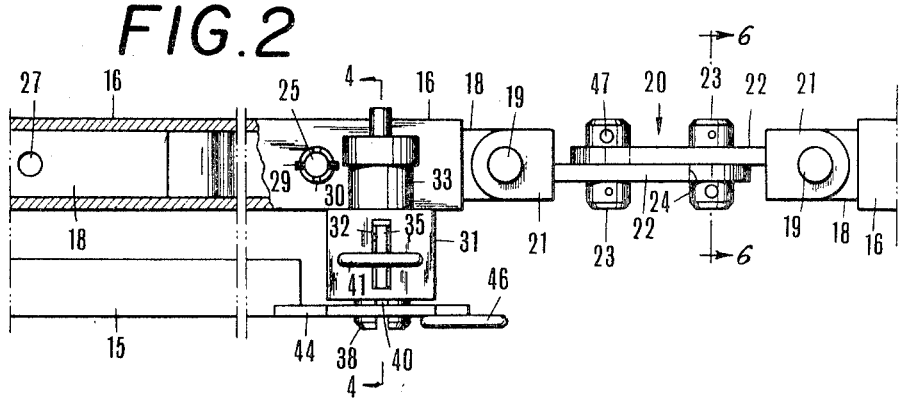
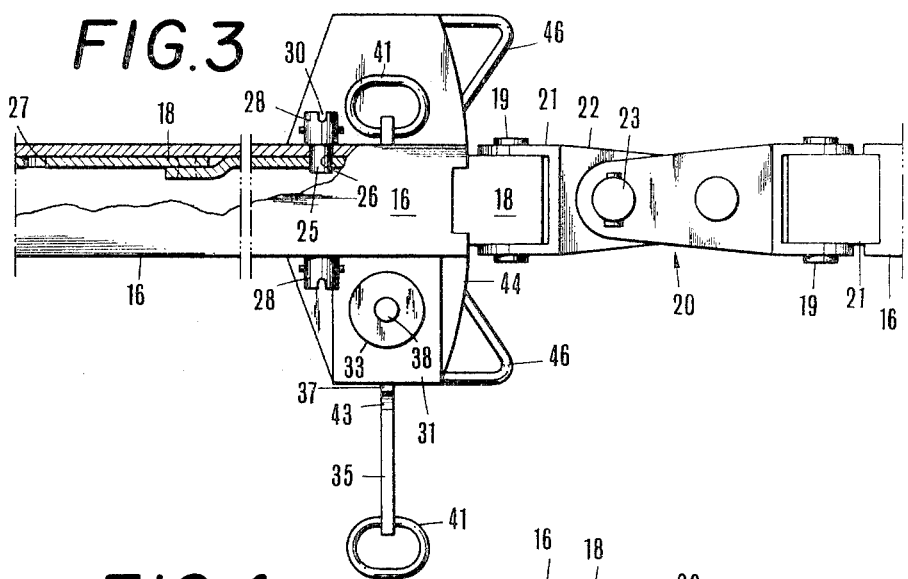
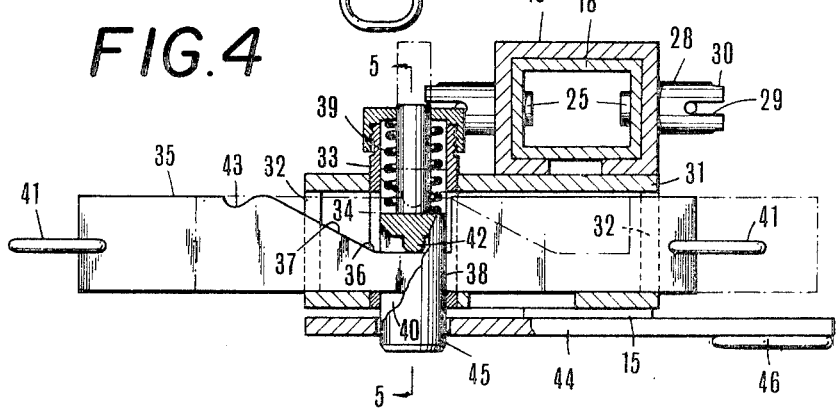

COUPLING DEVICE OF TRAILERS

This invention relates in general to couplers of vehicles, and more specifically to manually operable couplers form composing a train of trailers.

In air ports and stations, trains of cargo carts are used for carrying baggages and other cargos to and from aircrafts and wagons. For changing the running direction of a train of conventional cargo carts, e.g., for returning to a cargo terminal from an aircraft at a spot or for approaching again to the aircraft from the cargo terminal with new cargo, the train must turn along a circle of relatively large radius, because the train is limited in its driving direction to a predetermined direction. The radius of turning will increase according to the increase in number of the cargo carts which compose the train. This may sometimes be difficult, especially when the apron is crowded with aircraft and various kinds of working machinery and implements and many authorized personnel.

It is an object of the present invention to overcome this disadvantage by providing a simple and operative coupler for coupling and uncoupling trailers to facilitate easy and quick coupling and decoupling of the train and setting the train in reverse.

Other objects and advantages of the invention will be apparent from the following detailed description of the invention and a preferred embodiment thereof illustrated in the accompanying drawings, in which:

FIG. 1 is a diagrammatical elevational view of a couple of trailers jointed to each other by a coupling device embodying the invention;

FIG. 2 is a side elevational view of the coupling device;

FIG. 3 is a plan view of the coupling device;

FIG. 4 is an enlarged vertical sectional view along the line 4—4 of FIG. 2;

FIG. 5 is a sectional view along the line 5—5 of FIG. 4;

FIG. 6 is a fragmentary enlarged sectional view on the line 6—6 of FIG. 2;

FIG. 7 illustrates the coupling of a trailer to a tractor utilizing the coupling device of the invention; and FIG. 8 is a schematic plan view of a train of trailers jointed to one another by the coupling devices, when turning a corner.

The numeral 10 generally designates a trailer which includes a chassis 11, four road wheels 12 and two axles 13. Each axle 13 is mounted on a pivot at its center relative to the chassis 11. The two axles 13 are connected to each other by a tie rod 14 which extends diagonally between the two axles so that the deflection of the first wheel axle causes the second wheel axle to deflect with the same angle of movement but in an opposite direction. Thus, when turning a corner, the nearside wheels and the offside wheels are given with the same radii of turning, respectively, for running radially about a common center.

A steering lever 15 is rigidly secured at an end thereof to the center of each of the wheel axles 13 and extends outwardly at right angles to the respective wheel axle. The chassis 11 has a pair of towing levers 16, each of which levers is rotatably mounted at an end thereof to the chassis at 17 in axial alignment with the pivot of the wheel axle 13. A lever 18 is slidably disposed inside each of the towing levers 16 and has at its outer end a pin 19 for forming the rocking bearing for a joint member 20. The joint member 20 includes a forked end 21 for connection with pin 19 of the lever 18 and a plate portion 22 having a stud 23 and an opening 24 in longitudinal alignment.

A pair of pins 25 are provided on opposite side walls of towing lever 16 for selectively locking the inside lever 18 in its extended position or retracted position relative to the outer lever 16. In this connection, the slidable inside lever 18 has pairs of openings 26 and 27 on the sidewalls at points near the outer end portion and at points near the inner end portion thereof, respectively, corresponding to the pins 25 for the reception of the pins. In order to eliminate any frictional resistance of the pins 25 to the movement of the inside lever 18 when the lever is drawn outwardly or pushed inwardly relative to the outer lever 16, each of the pins 25 is slidably mounted in a housing 28 having slots 29 and 30 of different length for the selective engagement with the T-shaped head of the pin 25. The pin 25 is spring biased toward the inside lever 18. Thus, when the pin 25 engages with the slots 29 the pin is allowed to be thrusted toward the inside lever 18 for registering the lever in its selected position, while the engagement with the other slots 30 restricts the pin from frictional engagement with the inside lever 18. The operation of this telescopically movable inside lever 18 will be described more in detail hereinafter.

The towing lever 18 rigidly carries at the outer free end thereof a channel member 31 which has slot openings 32 on the opposite side walls. The channel member 31 firmly supports an upright sleeve member 33. The sleeve member 33 has a slot opening 34 in alignment with the slots 32 of the channel member 31. Slidably extended through the slots 32 and 34 in direction perpendicular to the lever 16 is a cam plate 35 which has a notch 36 of which side portion 37 has a diagonally aligned surface. A rod 38 is slidably mounted inside the upright sleeve 33 and is biased downwardly by a compression spring 39 acted at one end upon the rod 38 and at its other end upon the upper wall of the sleeve 33. The rod 38 also has a slot 40 of which upper end is adapted to ride upon the upper side of the cam plate 35. Thus, when the cam plate 35 is positioned as shown in FIG. 4 or when the notch 36 of the plate 35 is positioned beneath the rod 38, the spring 39 forces the rod to drive downwardly into engagement with the notch 36 of the cam plate 35 so as to project the lower end of the rod 38 from the bottom surface of the channel member 31. The cam plate 35 is movable by handles 41 at ends of the plate to slide through the slots 32, 34 and 40. Thus, when the cam plate 35 is driven to slide rightward in FIG. 4, diagonally aligned surface of side portion 37 to the notch 36 of the cam plate 35 serves to lift the rod 38 against the spring 39 until the lower end of the rod 38 retracts into the channel member 31 as shown in chain and dotted lines in FIG. 4. The upper end of the slot 40 in the rod 38 is preferably provided with a rounded portion 42 so that the frictional resistance between the rod and the cam plate will be reduced when they are driven to move relatively. The rounded portion 42 also serves to engage with a recess 43 on the upper side of the cam plate 35 so as to hold the rod 38 in its lifted position.

On the other hand, the steering hand, the steering lever 15 is provided at the free end thereof with a plate member 44 having an opening 45. The opening 45 is adapted to receive the lower end of the rod 38 thereinto when the rod is lowered by the engagement of its slot 40 with the notch 36 of the cam plate 35. Thus, the operation of cam plate 35 causes the engagement and disengagement of the towing lever 16 relative to the steering lever 15. The rod 38 on the towing lever 16 and the opening 45 in the outer end member 44 of the steering lever 15 are so arranged that only when the two levers are aligned in parallel to each other, the rod can enter into the opening 45. Thus, the member 44 of steering lever 15 is provided with handles 46 for the adjustment of the lever.

In operation, one end of each of the trailers 10 is first manually set to provide the engagement of the rod 38 with the opening 45 of a pair of levers 15 and 16, and the levers are left free from each other; by so setting, the wheels on the first side where the levers 15 and 16 are coupled become the front wheels of the trailer, and the wheels on the other side become the rear wheels. Then two trailers may be coupled by the engagement of the stud 23 and the opening 24 of the joint member 20 of the respective trailers. In order to prevent the stud 23 from accidentally disconnecting from the corresponding opening 24, the stud 23 is preferably provided with a locking element. In the embodiment as shown, the locking element comprises a pin 47 and a hole 48. As shown especially in FIG. 6, the stem of the pin 47 is reduced its diameter. Thus, after being set into the hole 48, the pin 47 will lower in the hole by gravity, thereby engaging both ends of the pin on the opposite edges of the hole 48. The opening 24 is preferably beveled along the peripheral edge thereof so as to facilitate the insertion of the corresponding stud thereinto.

Thus, a number of trailers can be joined to one another for composing a train. As previously described, the towing lever 16 can extend its inside lever 18 when desired. The joint member 20 is any suitable coupling. Thus, as illustrated in FIG. 7, the towing lever may be extended to a remote position at a different level. This will be advantageously applied to the coupling of the trailer to the tractor 49 of which joint member 50 is sometimes at a level different from the joint member 20 of the trailer.

As it clearly appears from FIG. 8, a train of trailers 10–1 to 10–4 can drive smoothly when it rounds a turn. The steering control on the tractor 49 is transmitted to the front wheel axle 13 of the last trailer 10–4 and a satisfactory turning circle or "lock" may be attained.

In FIG. 8, the reference characters R and R' are applied to the positions of rods 38 between the adjacent two trailers. The character R denotes the rod 38 at the position used to couple the steering lever 15 to the towing lever 16 for steering the front wheel axle of the trailer. The rod 38 at the position indicated by R' is free from the corresponding steering lever. The rod R" on the towing lever which extends from the tail end of the last trailer is not necessarily engaged with the corresponding steering lever. However, the said last rod R" is preferably engaged with the corresponding steering lever so that the towing lever at the tail end of the train will be prevented from dangerously swinging sidewards. When it is desired to return the train to the original place such as for returning to a cargo terminal from an aircraft, the tractor 49 is released from the first trailer 10–1 and jointed to the last trailer 10–4 by engaging the tractor's joint with the joint member at the rear end of the towing lever at the tail end of the last trailer. As described above, when the rod R" of the towing lever at the tail end of the last trailer 10–4 is previously engaged with the corresponding steering lever, the train is ready for driving reversely. In reversing the train, the rods at R should be disengaged from the corresponding steering lever, and at R' the rods should be engaged substitutely.

We claim:

1. In a trailer having two wheel axles each pivoted at its center to the chassis of the trailer and a tie rod diagonally extending between the two wheel axles for their connection to each other, a device for coupling the trailer with other vehicles comprising a pair of first levers each fix to the axle and extending from the center of the wheel axle oppositely to each other, a pair of second levers each rotatably connected at an end thereof to the chassis of the trailer in axial alignment with the pivot of the respective wheel axle, third levers each slidably disposed in said second lever and having joint means at the outer free end thereof for the connection with the other vehicle, means for registering said third lever in its extended or retracted position, a cam member slidably carried and guided by the other end portion of said second lever, handle means for operating said cam member, a vertical rod slidably supported by said other end portion of said second lever, spring means for biasing said vertical rod toward said cam member, a female member provided on the outer free end of said first lever for receiving an end of said vertical rod when the rod is projected from said second lever and handle means for operating said first lever so as to adjust its position to engage said female member with said rod.

2. A coupling device of trailers as claimed in claim 1 wherein the joint means for connection with other vehicle is a coupling having a pin and hole for engagement with the corresponding hole and pin, respectively, of the coupling of the other vehicle of similar construction.

3. A coupling device of trailers as claimed in claim 1 wherein the means for registering the third lever in its extended or retracted position consists of a pin slidably carried by the second lever and openings provided on the third lever at a point near the outer end portion and at a point near the inner end portion thereof, respectively.

4. A coupling device of trailers as claimed in claim 1 wherein the cam member extends at right angles to the axis of the second lever and slidably carried by a guide member secured to the outer end of the second lever.

5. A coupling device of trailers as claimed in claim 1 wherein the cam member is a plate having a notch on the upper side thereof for engagement with the slot underside of the vertical rod.

6. A coupling device of trailers as claimed in claim 5 wherein the notch has a portion flared upwardly, which portion serves to lift the vertical rod therealong when the cam plate is driven to slide longitudinally.

* * * * *